INVENTOR.
HOWARD L. YARBROUGH
BY
Knox & Knox

INVENTOR.
HOWARD L. YARBROUGH
BY
Knox & Knox

INVENTOR.
HOWARD L. YARBROUGH
BY
Knox & Knox

United States Patent Office 3,132,287
Patented May 5, 1964

3,132,287
HIGH FREQUENCY CIRCUIT BREAKER UTILIZING SILICON CONTROLLED RECTIFIERS
Howard L. Yarbrough, San Diego, Calif., assignor to The Ryan Aeronautical Co., San Diego, Calif.
Filed Mar. 14, 1961, Ser. No. 95,613
10 Claims. (Cl. 317—33)

This invention relates to a circuit breaker, and more particularly to an arrangement that breaks an alternating current circuit in case of an overload or malfunction.

Background

It is well known that when a circuit, a wire, or some other electrical device is "overloaded," that is, caused to carry too much electrical current, it may be burned out, overheated, or damaged in some other respect. The most usual device for protecting the circuit is a fuse. This contains a link whose material evaporates under overload conditions, thus breaking the circuit and protecting the elements thereof. Unfortunately, it is quite troublesome to replace a fuse, so many other types of circuit breakers have been introduced.

A particularly difficult problem arises when a transistorized circuit carrying high frequency alternating current is overloaded. Transistors are especially susceptible to burn out, and the high frequency eliminates many circuit breakers that operate satisfactorily at low frequencies and for direct currents. This problem becomes particularly acute when the equipment is airborne; because here weight, maintenance, and reliability becomes important factors.

Objects

It is therefore the principal object of my invention to provide an improved circuit breaker.

It is another object of my invention to provide an improved circuit breaker that is suitable for high frequency alternating current circuits.

It is a further object of my invention to provide an improved circuit breaker that operates fast enough to protect transistorized circuits.

It is still another object of my invention to provide an improved alternating current circuit breaker that is lightweight, reliable, and easy to maintain.

The attainment of these objects and others will be realized from the following specification, taken in conjunction with the drawings, of which:

Broadly stated, my invention contemplates a circuit-breaking arrangement that uses a solid-state controlled rectifier to break the high frequency alternating current circuit, and uses a direct-current-operated relay or magnetic amplifier to control the cutoff of the solid state controlled rectifier.

The Load Circuit

Figure 1:
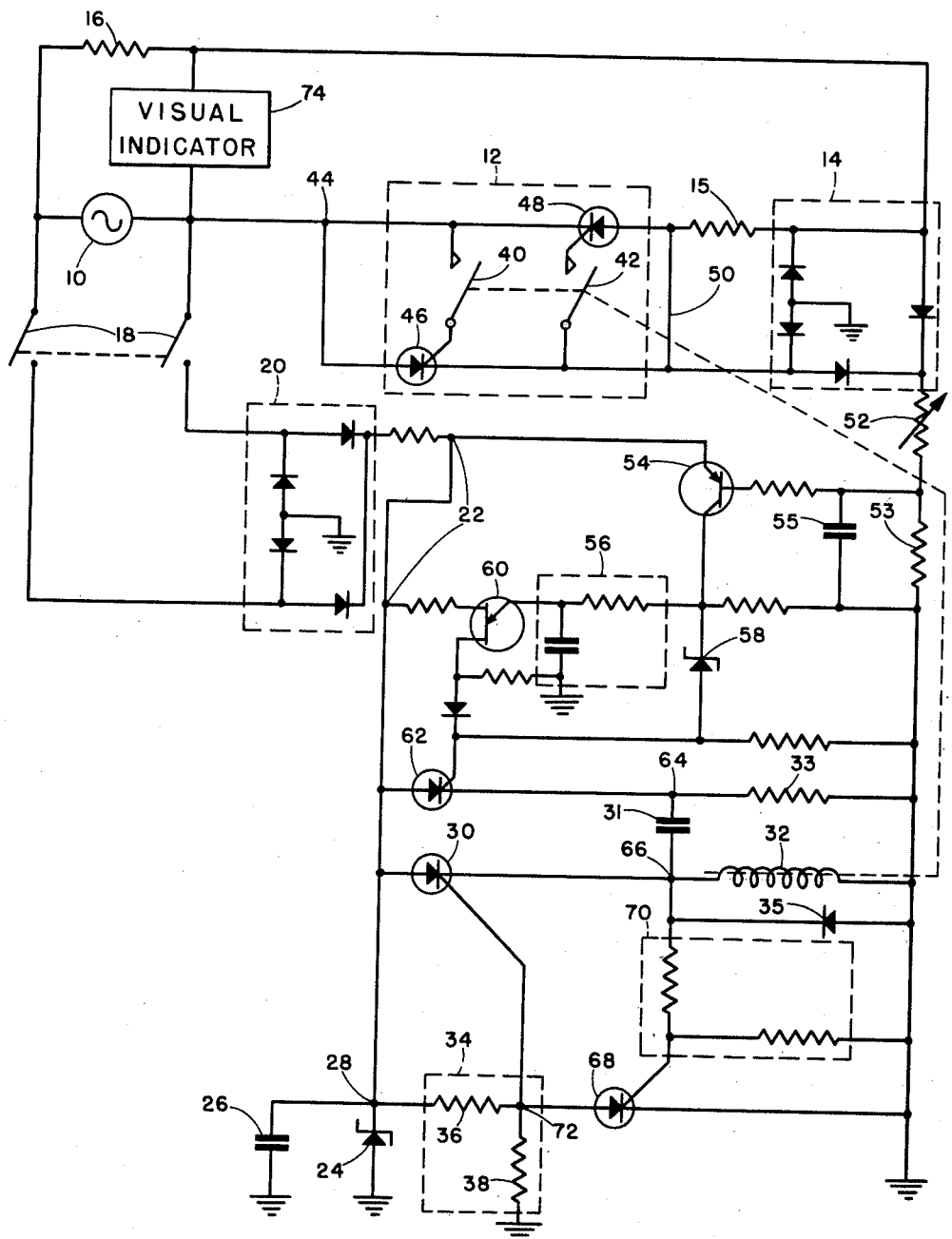
FIGURE 1 shows my basic inventive concept, wherein the operation uses a relay, and is manually started and manually reset.

Referring now to FIGURE 1, it will be seen that electricity flows from alternating current source 10 through switching means 12 and sensing unit 14 to a load 16; these elements forming the load circuit. Under conditions of malfunction or overload, load 16 draws too much electrical current, and may damage itself, the wires feeding it, and/or other elements associated therewith. It is this eventuality that my circuit prevents.

The Control Circuit

Assume, for the moment, that switching means 12 is open, that is, non-conductive, and prevents the flow of alternating current from source 10 to load 16. To start operation of the circuit, switch 18 is closed, and alternating current power from source 10 is applied to rectifier 20, shown as a full-wave rectifier. This produces an operating direct voltage at terminals 22. The resultant direct voltage is used for operating a plurality of devices. This direct voltage is applied to a zener diode 24, which co-acts with a filtering capacitance 26 to produce at terminal 28 a steady fixed-value of direct voltage. The filtered direct voltage is applied to control element 30.

This is a solid state device of the type known as a controlled silicon rectifier. This device has no moving parts, no vacuum, requires no maintenance, and is available in a large variety of current carrying abilities. Controlled rectifiers have but three parts; an anode represented by the arrow head, a cathode represented by the transverse line, and a control connection represented by the angled line. Controlled rectifiers are activated to conduct current when a suitable operating potential is applied across their anode-cathode circuit, and a signal is applied to their control connection. The controlled rectifier device then continues to conduct until its operating potential is removed, or its cathode is raised to or above the potential at the anode.

It will be noted that control device 30 has its anode connected to the direct voltage, and has its cathode connected to ground through a coil 32, whose function will be discussed later.

A voltage divider 34, comprising resistances 36 and 38, applies a portion of the direct voltage from terminal 28 to the control connection of control device 30. Device 30 is therefore activated to conductivity, and current flows to ground through two paths. The first path comprises capacitance 31 and resistance 33, and charges up capacitance 31 which maintains its charged state. The second path comprises coil 32. In order to limit the inductive surge produced when current flows through coil 32, I connect a diode 35 across it.

Coil 32 is the field coil of a relay, and as soon as coil 32 is excited by current flowing through it, the relay closes contacts 40 and 42.

Normal Operation

Referring back to the load circuit, it was previously explained that current could not flow through the open switching means 12. The switching means is activated when contacts 40 and 42 close, the activation taking place as follows: Assume that junction 44 is momentarily positive. This places potential of the correct polarity across switching device 46. Simultaneously its control connection receives a signal from junction 44 through the now-closed relay contact 40. Thus switching device 46 is activated, and current flows from source 10 through switching device 46 to load 16.

When the current reverses, junction 44 becomes negative, and switching device 46 cuts off. Now though second switching device 48 has the correct polarity of potential applied to it, and a suitably polarized signal is applied to its control connection through wire 50. Switching device 48 therefore becomes conductive, and alternating current flows through it to load 16.

It may thus be seen that the parallel-connected oppositely-poled controlled rectifiers 46 and 48 permit current to flow to load 16, the controlled rectifiers 46 and 48 being conductive for alternate half cycles. This operation continues for normal conditions, during which the switching devices 46 and 48 are conductive, and coil 32 holds relay contacts 40 and 42 closed.

The Disabling Circuit

In case of an overload or malfunction, increased current flows through the load circuit, and through current sensing unit 14. This unit may take any suitable form consistent with high frequency alternating current operation. FIGURE 1 shows it as a full wave rectifier that converts alternating current to a direct current signal that corresponds to the amount of alternating current flowing through sensing resistor 15. The resultant direct current flows through variable resistance 52 and resistance 53 to ground, in this way producing a signal that is applied to transistorized amplifier 54, which in turn selectively activates integrating circuit 56 and zener diode 58. Resistors 52 and 53 form an adjustable voltage divider that controls the transistor amplifier 54; and capacitance 55 filters the direct voltage applied to the base of transistor 54.

If the malfunction is a "cumulative" one, such that the current in the load circuit increases slowly or repetitiously, integrating circuit 56 eventually develops a potential that causes unijunction transistor 60 to trigger controlled rectifier 62. If, on the other hand, the malfunction is an "acute" one, such that the current in the load circuit increases suddenly, then zener diode 58 becomes conductive and triggers controlled rectifier 62. Thus, regardless of its type, a malfunction triggers controlled rectifier 62. This is therefore activated to conductivity, and raises the potential at the negative terminal 64 of capacitance 31. Since capacitance 31 is in its fully charged state, the potential at its other terminal 66 is raised a like amount. This increased potential is applied to the cathode of control element 30, thereby cutting it off so that it becomes non-conductive. As soon as control element 30 becomes non-conductive, current flow through coil 32 is interrupted, and relay contacts 40 and 42 open. The open contacts disable switching devices 46 and 48 by preventing them from becoming conductive at the next cycle. These open devices interrupt the flow of current through load 16, thus protecting it and associated elements in case of overload.

It may thus be seen that my invention interrupts the load current at the cycle following overload, and tests have shown that this circuit-breaking operation is fast enough to prevent transistors from burning out. Once the circuit has been broken, it is an indication of the existence of a malfunction that should be corrected before the power is turned on again.

To assure that switching means 12 remains non-conductive until intentionally reset, I use the following approach. A controlled rectifier 68 has its control connection activated by voltage divider 70. When control device 30 is first activated, voltage divider 70 activates device 68, which connects junction 72 to ground.

Even though the load circuit has been broken, switch 18 is still closed and the direct voltage at terminal 28 keeps controlled rectifier 68 in its conductive state; and controlled rectifier 68 keeps the control connection of control device 30 at ground potential. As long as this grounding connection is maintained the circuit cannot accidentally resume operation.

The Resetting Operation

When the malfunction has been corrected, switch 18 is opened. This de-energizes all the circuits, and returns them to their initial inoperative state, the grounding action of control rectifier 68 also being deactivated.

To re-initiate operation, switch 18 is again closed, and operation is resumed in the manner previously described.

A Refinement

When the operation of the circuit has been interrupted because of a malfunction, it is desirable that the situation be called to the attention of the operator, so that appropriate action can be taken. I accomplish this by means of a visual indicator 74, such as a light, that is connected to be activated when switching means 12 is open.

A Second Embodiment

Figure 2:
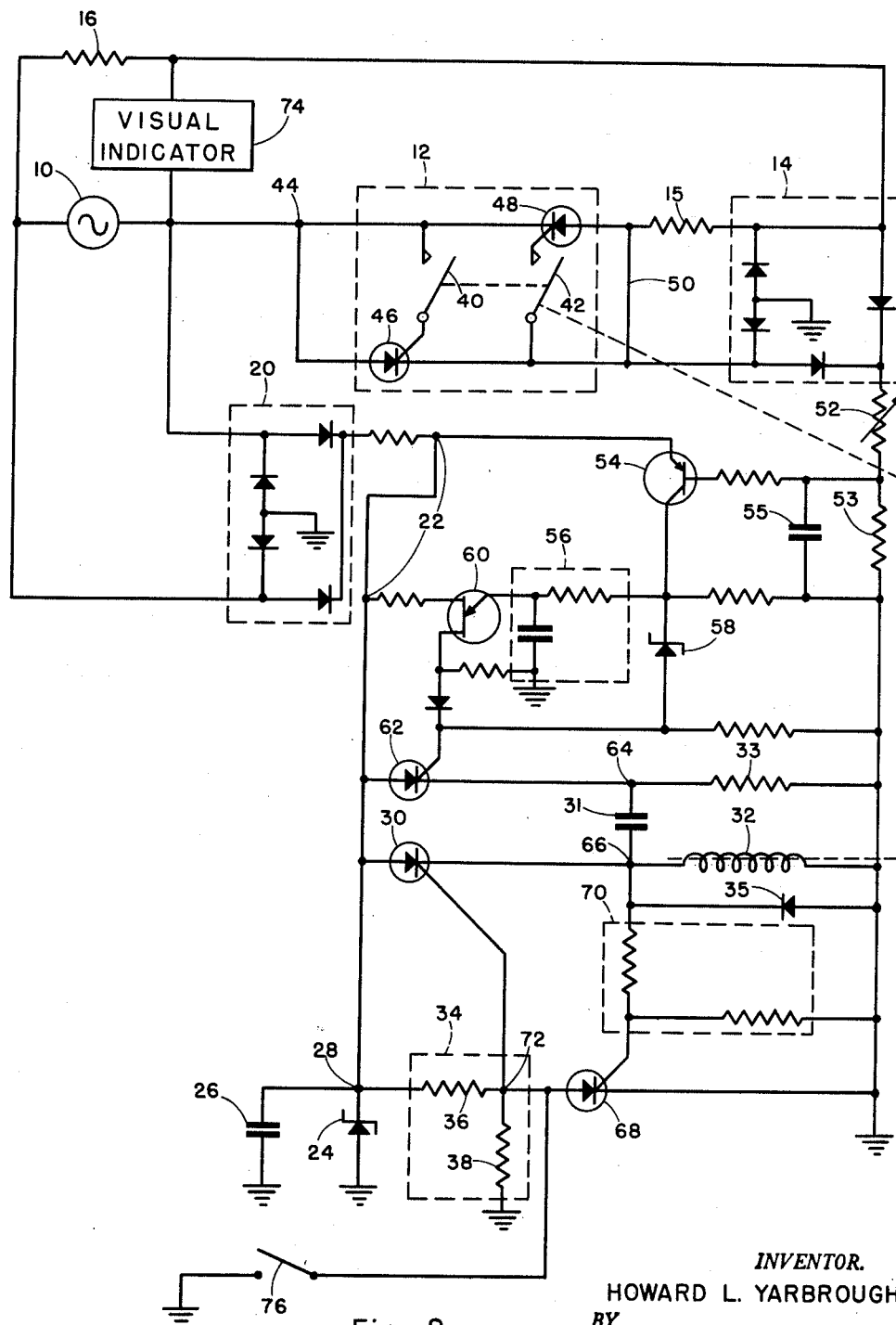
FIGURE 2 shows another embodiment wherein the circuit uses a relay, and is self-starting, but manually reset.

There are times when it is desirable to connect equipment directly to the power source, without the use of a switch. Such a circuit is shown in FIGURE 2. This is substantially the same as the circuit previously described. Since, however, switch 18 of FIGURE 1 has been eliminated, the circuit requires a different kind of re-setting arrangement. This is shown to comprise a resetting switch 76 connected between the anode of controlled rectifier 68 and ground.

As previously explained, once the circuit has been disabled, controlled rectifier 68 maintains the disabled state. After the malfunction has been corrected, reset switch 76 is momentarily closed. This action short circuits device 68, and deactivates it so that its grounding action is broken. When resetting switch 76 is opened, the control connection of control device 30 is then enabled to receive a potential from terminal 72 as previously explained.

Third Embodiment

As is well known, a relay has contacts that are susceptible to wear, erosion, arcing, and the like. After a period of use, these contacts may produce unreliable results.

Figure 3:
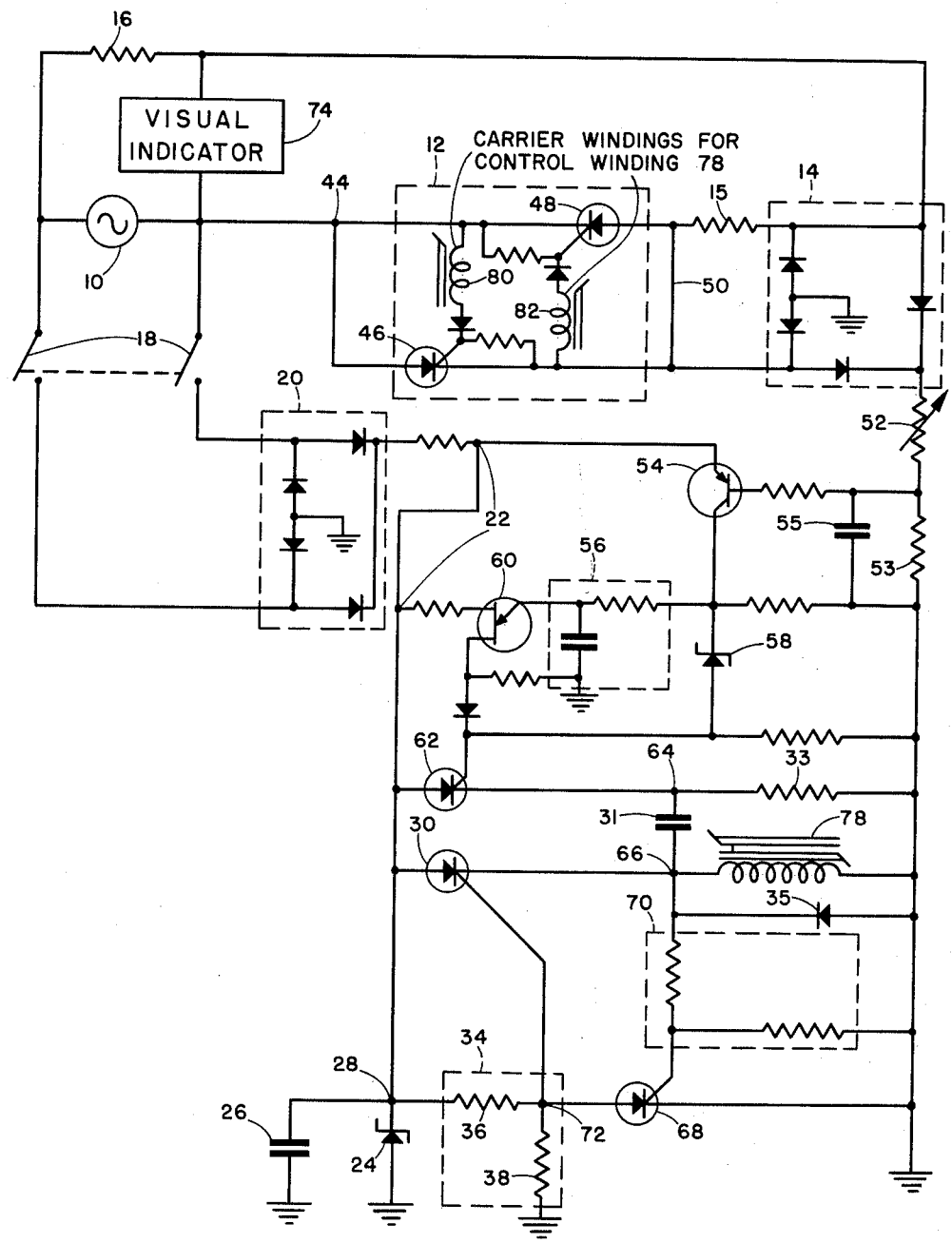
FIGURE 3 shows a further embodiment wherein the circuit uses a magnetic amplifier, the operation being manually started and reset.

I overcome this shortcoming in the circuit of FIGURE 3, by using a magnetic amplifier instead of a relay. The coil 32 of FIGURE 1 is replaced by the control winding 78 of a magnetic amplifier. The mechanical relay contacts 40 and 42 of FIGURE 1 are replaced by the carrier windings 80 and 82 of the magnetic amplifier. All other circuitry is the same.

It is of course possible to use the magnetic amplifier embodiment of FIGURE 3 with the self-starting circiut of FIGURE 2.

Advantages

My invention permits high-speed circiut breaking operation of a high frequency alternating current circuit. The switching devices are controlled silicon rectifiers that are solid state devices of proven ability. The control means comprises a direct current operated contractor; such as a relay, a magnetic amplifier, or the like, which are also of proven ability. My circuit works fast and with a snap-action type of operation, and requires very little care or attention.

It is understood that minor variation from the form of the invention disclosed herein may be made without departure from the spirit and scope of the invention, and that the specification and drawing are to be considered as merely illustrative rather than limiting.

I claim:
1. A circuit breaker circuit comprising:
   a source of alternating current;
   a load circuit comprising a series-connected load to be supplied by said source of alternating curent;
   current sensing means for sensing the amount of alternating current flowing through said load;
   switching means for controlling whether or not said alternating current flows through said load, said switching means comprising a pair of parallel-connected, oppositely-poled controlled rectifiers; and control circuit means, triggered by said current sensing means, for controlling the state of said switching means, whereby said control circuit means normally causes said switching means to be conductive, but when said control circuit means is triggered it causes said switching means to assume a non-conductive disabled state, said control circuit means comprising a direct current operated control device for controlling the state of said switching means and a controlled rectifier connected in series therewith that disables said direct current operated control de- vice when triggered by said current sensing means.

2. The combination comprising:
a source of alternating current;
a load to be supplied by said source;
alternating current sensing means, said means producing a direct current signal;
switching means comprising a pair of parallel-connected oppositely-poled controlled rectifiers;
means for forming a series-connected alternating current load circuit from said source, said load, said sensing means, and said switching means;
a direct current operated control device;
and means, comprising said direct current signal from said sensing means, for causing said direct current operated control device to control the state of said switching means.

3. The combination comprising:
a source of alternating current;
a load to be supplied by said source;
alternating current sensing means, said means producing a direct current;
switching means comprising a pair of parallel-connected oppositely-poled controlled rectifiers;
means for forming a series-connected alternating current load circuit from siad source, said load, said current sensing means, and said switching means;
means for producing operating direct voltage;
a direct current operated control device;
means for activating said direct current operated control device from said operating direct voltage;
said activating means comprising a controlled rectifier;
means, comprising said direct current from said current sensing means, for triggering said direct current operated control device to control the state of said switching means.

4. A circuit breaking circuit comprising:
a source of alternating current;
a load to be supplied by said source of alternating current;
current sensing means for sensing the amount of said alternating current flowing to said load, said current sensing means comprising rectifier means for producing a direct current signal corresponding to the amount of alternating current flowing through said current sensing means;
switching means for controlling whether said alternating current flows to said load, said switching means comprising a pair of parallel-connected oppositely-poled controlled rectifiers, each said rectifier having a control connection;
means for forming said source, said load, said current sensing means, and said switching means into a series-connected load circuit;
rectifier means; activated by said source of alternating current, for producing direct current operating power;
control circuit means, activated by said direct current operating power, for controlling the state of said switching means, whereby when said control circuit means is triggered, it causes said switching means to assume its non-conductive state, said control circuit means comprising a series-connected controlled rectifier and a direct current operated control device, said direct current operated control device having means for controlling the conductivity of the control connections of said controlled rectifiers in said switching means;
and triggering means, activated by said direct current signal from said current sensing means, for triggering said control circuit means to control the state of said switching means.

5. A circuit breaker circuit comprising:
a source of alternating current;
a load circuit comprising a series-connected load to be supplied by said source of alternating current, current sensing means for sensing the amount of alternating current flowing through said load, and switching means for controlling whether said alternating curernt flows through said load, said switching means comprising a pair of parallel-connected, oppositely-poled controlled rectifiers having control connections;
control circuit means for controlling the state of said switching means, whereby said control circuit means normally causes said switching means to be conductive, but when said control circuit means is triggered it causes said switching means to assume a non-conductive disabled state, said control circuit means comprising a direct current operated control device and a controlled rectifier connected in series therewith, said directive current operated control device having means for completing the circuit of said control connections of said controlled rectifiers in said switching means;
and triggering means, activated by said current sensing means, for triggering said controlled rectifier of said control circuit so that it causes said switching means to assume its disabled non-conductive state.

6. The combination of claim 5 including means for maintaining said control circuit means in its triggered state until the circuit breaker circuit is intentionally reset.

7. The combination of claim 5 wherein said direct current operated control device comprises the coil of a relay, and the contacts of said relay comprise the means for completing the circuit of the control connections of the controlled rectifiers in said switching means.

8. The combination of claim 5 wherein said direct current operated control device comprises the control winding of a magnetic amplifier, and the carrier windings of said magnetic amplifier comprise the means for completing the circuit of the control connections of the controlled rectifiers in said switching means.

9. The combination of claim 5 wherein said triggering means comprises zener diode trigger signal producing means for producing a triggering signal upon the occurrence of an acute malfunction, and integrator trigger signal producing means for producing a trigger signal upon the occurrence of a cumulative malfunction.

10. A circuit-breaking circuit comprising:
a load series-connected a load circuit comprising a source of alternating current power, a load to be supplied by said source, switching means for controlling whether alternating current flows to said load, said switching means comprising a pair of parallel-connected oppositely-poled controlled rectifiers, and current sensing means, said sensing means having means for producing an output signal corresponding the amount of alternating current flowing through said sensing means;
disabling circuit means, comprising a series-connected controlled rectifier and a direct current operated control device, for causing said switching means to assume its non-conductive state to interrupt the flow of current in said load circuit;
and triggering means, comprising a normally charged capacitance, and activated by said output signal from said current sensing means, for triggering said disabling circuit when the alternating current in said load circuit increases.

References Cited in the file of this patent
UNITED STATES PATENTS
2,920,240    Macklem _____ Jan. 5, 1960
OTHER REFERENCES
"Silicon Controlled Rectifier Manual" (page 93, General Electric, March 20, 1960).